(12) United States Patent
Shapiro

(10) Patent No.: US 7,066,485 B2
(45) Date of Patent: Jun. 27, 2006

(54) COMPACT WAGON OR CART INCLUDING STOWABLE WHEELS AND HANDLE

(76) Inventor: Richard N. Shapiro, 1294 Diamond Springs Rd., Virginia Beach, VA (US) 23455

( * ) Notice: Subject to any disclaimer, the term of this patent is extended or adjusted under 35 U.S.C. 154(b) by 9 days.

(21) Appl. No.: 10/916,542

(22) Filed: Aug. 12, 2004

(65) Prior Publication Data

US 2005/0012307 A1     Jan. 20, 2005

Related U.S. Application Data

(60) Division of application No. 10/157,980, filed on May 31, 2002, which is a continuation-in-part of application No. 09/604,769, filed on Jun. 28, 2000, now Pat. No. 6,581,945.

(51) Int. Cl.
*B62B 7/00*     (2006.01)
(52) U.S. Cl. ..................... 280/651; 280/47.34
(58) Field of Classification Search ............. 280/47.19, 280/47.26, 47.37, 47.371, 35, 30, 37, 40, 280/651, 655, 655.1, 79.2, 79.4, 646, 47.35, 280/47.315, 47.11, 47.18, 87.01, 87.05
See application file for complete search history.

(56) References Cited

U.S. PATENT DOCUMENTS

| | | | | |
|---|---|---|---|---|
| 987,895 A | * | 3/1911 | Long | 280/37 |
| 1,017,983 A | * | 2/1912 | Long | 280/37 |
| 4,109,926 A | * | 8/1978 | Lane | 280/39 |
| 4,887,836 A | * | 12/1989 | Simjian | 280/651 |
| 5,141,241 A | * | 8/1992 | Avila | 280/47.371 |
| 6,733,026 B1 | * | 5/2004 | Robberson et al. | 280/415.1 |
| 6,845,991 B1 | * | 1/2005 | Ritucci et al. | 280/30 |

* cited by examiner

*Primary Examiner*—Christopher P. Ellis
*Assistant Examiner*—Bridget Avery

(57) ABSTRACT

Compact carrier devices with stub walls, including wagons, carts and wheelbarrows, are disclosed, which include fixed, stowable and/or pivoting wheels, as well as stowable handles. In various embodiments, simple manually manipulable methods latch each wheel and handle in stowed flat positions within the overall perimeter and profile of the devices, which effectively allows the devices to fold to an ultra flat profile without any wheel or component being detached. Associated innovations include unique nesting methods, both unique center push/pull handles and U shaped handle designs, unique handle access panels, device couplers, simple methods to fixate or allow device wheels/axles to rotate, as well as snap on accessories which are designed to hold drink containers, fishing rods and implements.

17 Claims, 15 Drawing Sheets

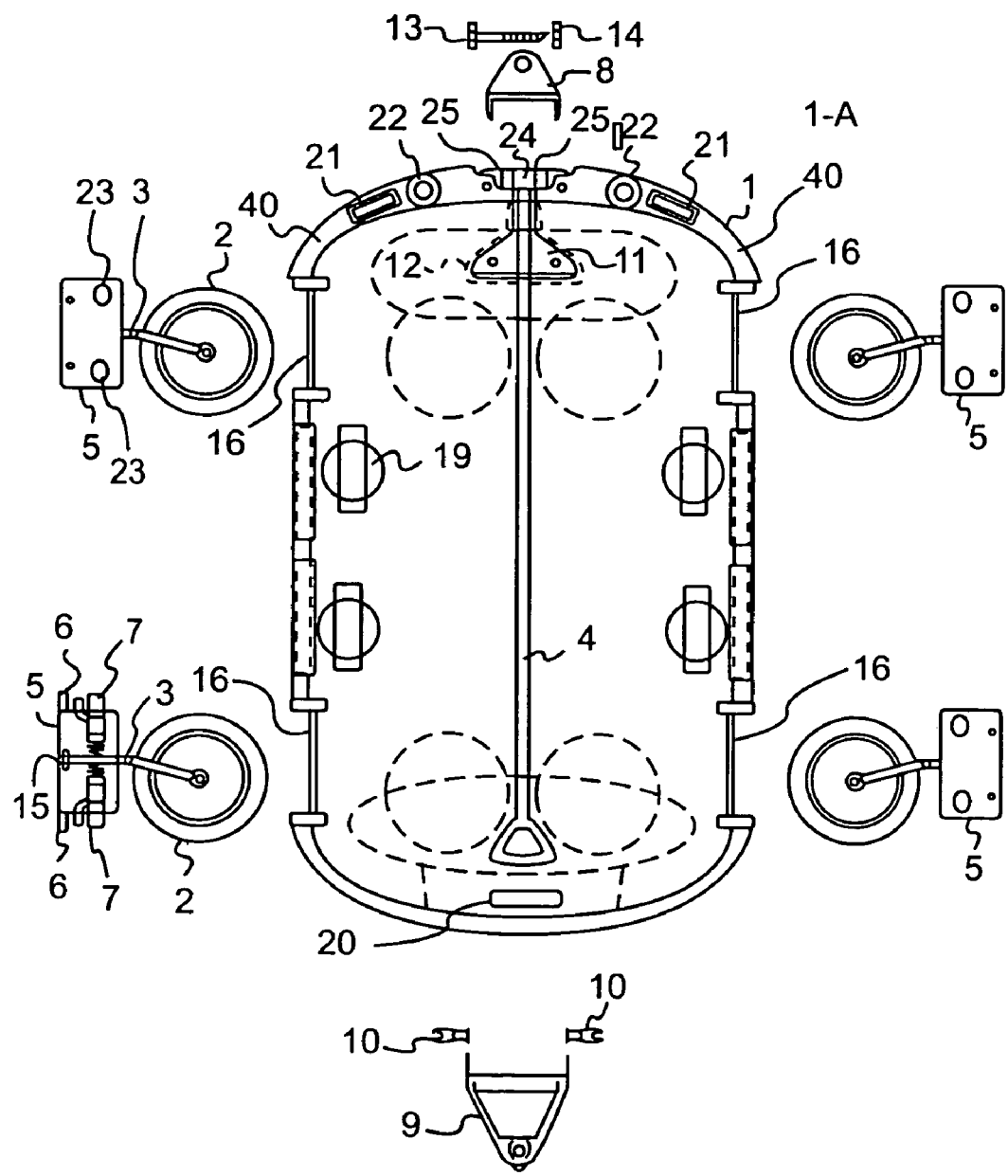
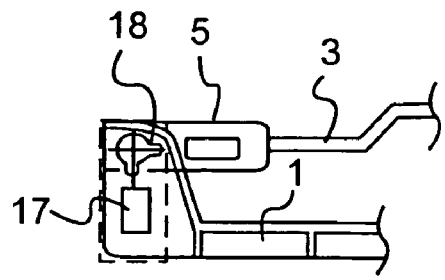
FIG. 3
FIG. 3A

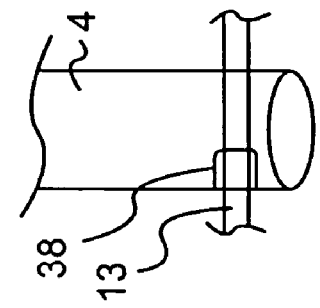
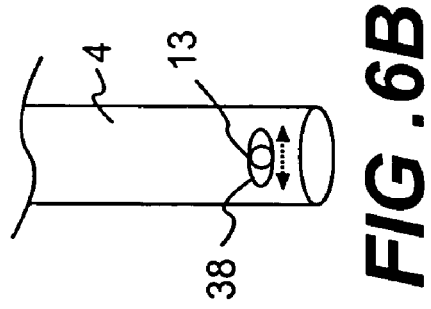
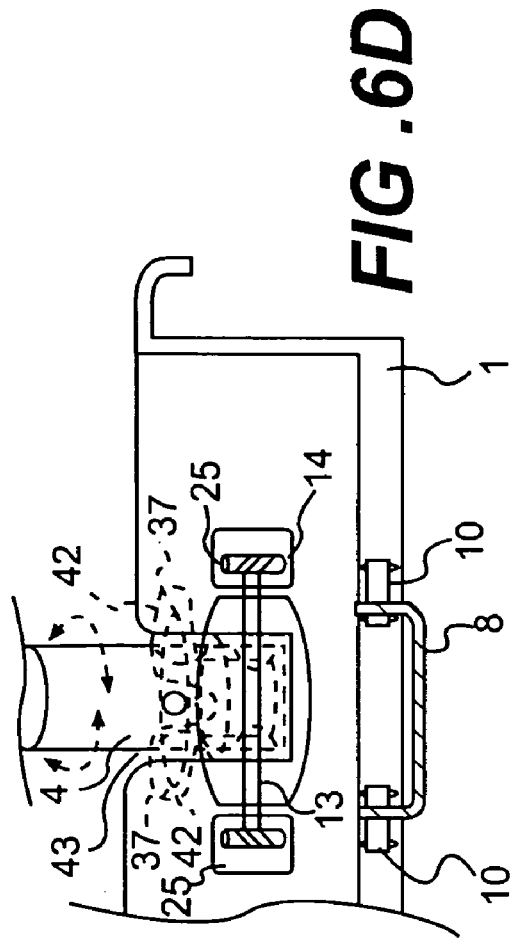
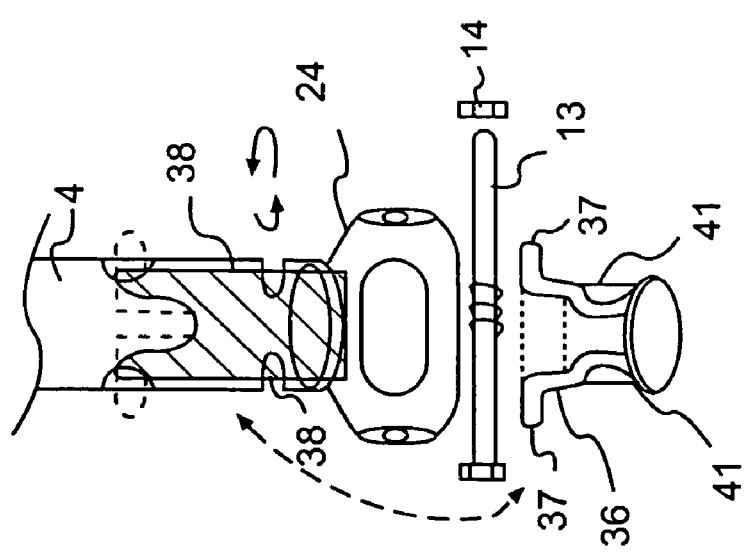

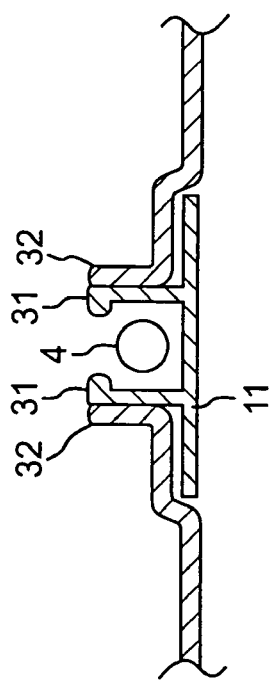
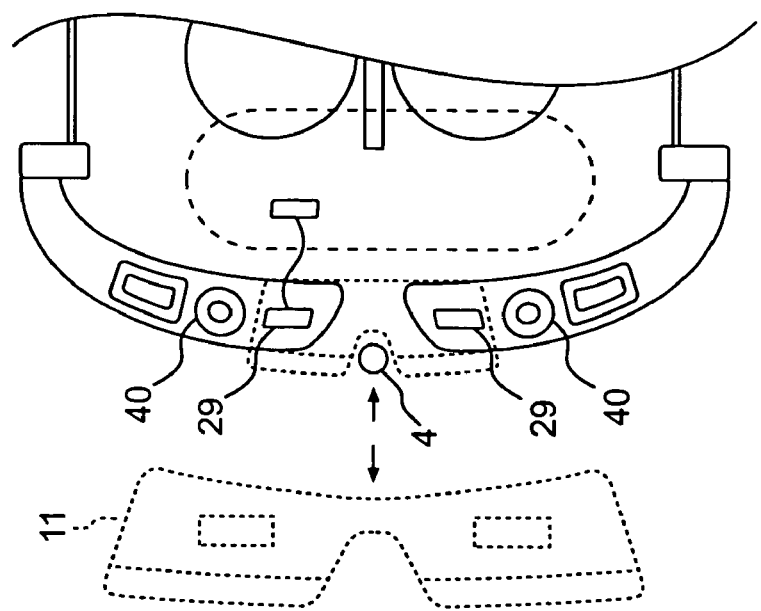
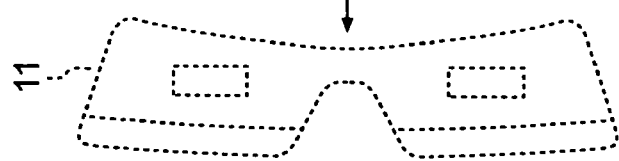
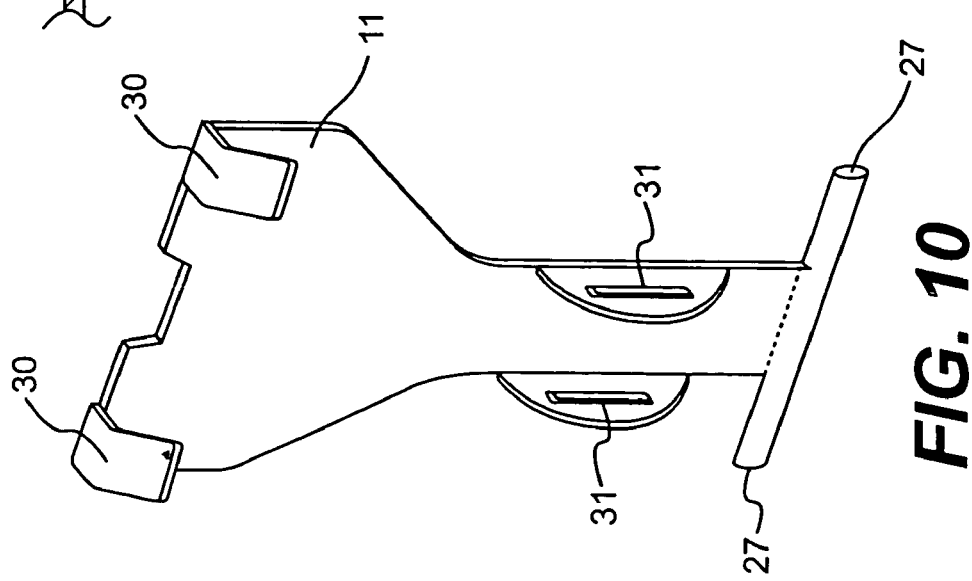

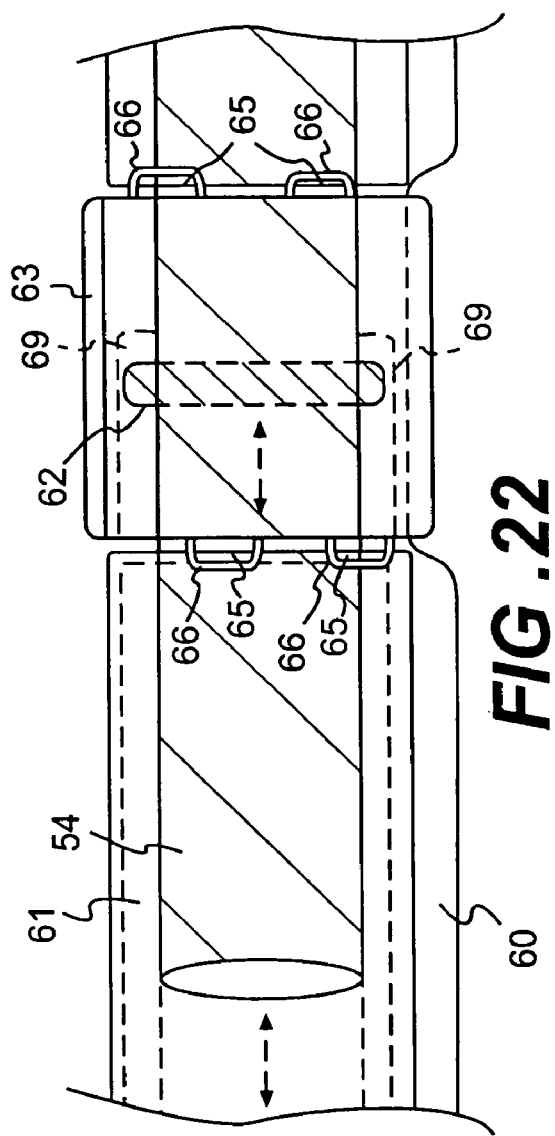
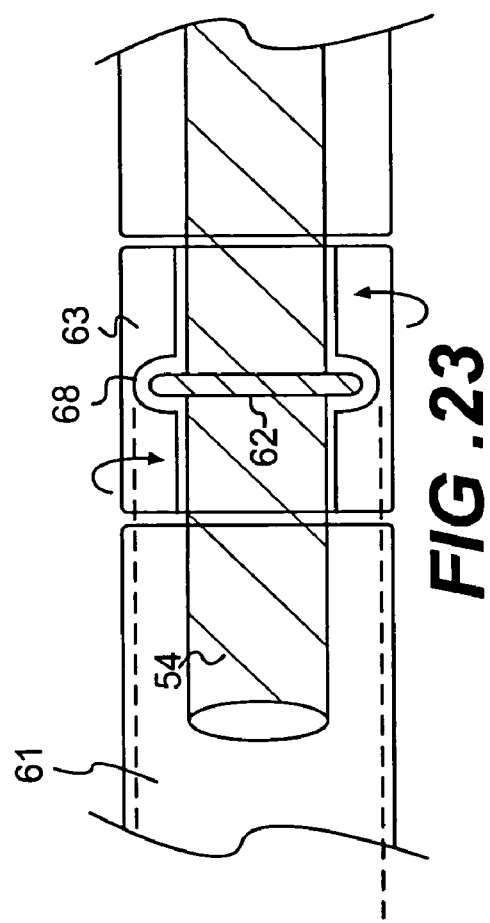

US 7,066,485 B2

COMPACT WAGON OR CART INCLUDING STOWABLE WHEELS AND HANDLE

RELATIONSHIP TO ALL OTHER APPLICATIONS

This application is a division of U.S. patent application Ser. No. 10/157,980 filed on May 31, 2002, which is a continuation-in-part of U.S. patent application Ser. No. 09/604,769 filed on Jun. 28, 2000, now U.S. Pat. No. 6,581,945, which issued Jun. 24, 2003.

Other related applications include Shapiro's previous U.S. application Ser. No. 09/271,274, filed on Mar. 17, 1999, U.S. Pat. No. 6,220,611, which issued Apr. 24, 2001.

FIELD OF THE INVENTION

The present invention relates to carrier devices including wagons, carts, and wheelbarrows, and methods to stow or pivot wheels, and all component parts, and otherwise create ultra-thin stowed profiles for such wagon and cart devices.

BACKGROUND OF THE INVENTION

In U.S. Pat. No. 6,220,611, granted Apr. 24, 2001, the applicant, Shapiro, disclosed unique methods relating to pivoting and stowable wheel axle assemblies for wagons and carts, and related innovations. Improvements were further disclosed in the continuation-in-part U.S. patent application Ser. No. 09/604,769, above referenced. This application provides further refinements and enhancements to compact carrier and wagon devices, which may be adapted on wheeled carts as well. Many of the enhancements here relate to wagons or carts with a base incorporating formed stub walls, with pivoting or stowable wheels and handles.

It is one object of this invention to provide for innovations relating to methods to stow wheels and handles on wagons and carts, and the means by which these wheels and handles may be mounted to such wagons and carts in simple and convenient fashion.

It is another object of the invention to provide for convenient nesting and stowing of cart or wagon devices whereby they may be nested in unique and convenient fashion.

It is another object of the invention to provide for several unique embodiments of stub wall access panels which have features relating to the stowable handle, which access panels have various innovative features, including retention protrusions to hold a stowable handle in various positions, whether intermediate or stowed positions. Also, the access panel may pivot, or may slide upward or laterally.

It is another object of the invention to provide for unique stowable couplers whereby two or more wagons may be coupled and a user may pull the coupled devices with a single handle. Also one of the couplers may double as a wall hook receiving device.

It is another object of the invention to provide for unique methods to provide that a wagon or cart handle may be retained at one or more intermediate positions and very simply rotated, moved, or pressed through retention protrusions so that the same handle may stow within the compact wagon device.

It is another object of the invention to provide that a handle for a wagon or a cart device may be mounted just forward of the stub wall profile of said device, on integrated protrusions which will serve to secure the handle with a through bolt, or alternatively, said handle may be mounted flush with the profile or perimeter of the stub wall of the wagon or cart device, or in another alternative embodiment, may be secured and mounted just inside the handle side end wall of said device.

Another object of the invention provides for a wheeled cart or wheelbarrow, with fixed, or one or more pivoting or stowable wheel axles, as well as a U-shaped handle which is slidably disposed within a cavity formed along the cart stub wall, and the user may slide the handle out to an operative, latched position, and said cart may include underside movable or pivoting, stowable supports. Unique handle latching methods are disclosed.

Another object of the invention provides for a unique, but simple nut or end cap washer or fastener which rotates in a cavity, or depending on both the cavity shape and the nut or cap shape, combine to stop or limit axial rotation of the stowable wheel's axle rod.

Another object of the invention provides for a "sleeve" accessory which may be resiliently and selectively attached to recesses or protrusions formed on the face of the device stub wall, which sleeve may hold beverage containers, umbrellas, fishing rods, or various implements.

These and other improvements may become apparent by virtue of descriptions contained herein.

BRIEF DESCRIPTION OF THE DRAWINGS

FIG. 3 is a top plan view, partially exploded, showing the major components of the device 1-A;

FIG. 3-A is a end elevational view, broken away, showing the wagon side wall and base;

FIG. 4-A is a side elevational view, partly with a longitudinal cross-section perspective, isolating certain components;

FIG. 5-A is an end elevational perspective, in cross section, isolating the wheel axle assembly components and handle;

FIG. 6-A is an exploded view of handle retention components;

FIG. 6-B is a broken away perspective of the handle;

FIG. 6-C is a partly broken away view of selected handle components;

FIG. 6-D is an end elevational view, partially in cross section, isolating certain handle retention components;

FIG. 8-A is an end elevational perspective of the wheeled device 1-A isolating two alternative sliding access panel features;

FIG. 10 is a detached perspective of the access panel component of wheeled device 1-A;

FIG. 11 is a top plan perspective of certain handle and access panel components of wheeled device 1-A;

FIG. 12 is a top plan view, partially broken away, further focusing on the handle and access panel components of wheeled device 1-A;

FIG. 15-B is a side elevational perspective, partly in section, of a portion of the wheel assembly;

FIG. 16-B is a top plan perspective of an inside threaded washer embodiment;

FIG. 16-C is a top plan perspective of a specially shaped inside threaded washer embodiment;

FIG. 16-D is a top plan perspective focusing on the wheel assembly cavity details;

FIG. 17-B is a side elevational perspective, in section, showing details of the sleeve and device stub wall;

FIG. 17-C is a side elevational perspective, broken away, of the sleeve accessory holding an implement;

FIG. 18-A is a broken away view of the end cap details of the U-Shaped handle of the carrier device 51;

FIG. 18-B is a broken away perspective providing details of the underside support;

FIG. 18-C is a bottom plan view of the carrier device 51;

FIG. 18-D is an end elevational cross sectional perspective of carrier device 51, the stub wall and lip;

FIG. 22 is a top plan perspective, partly in section, of device 51 handle and an embodiment of a latching structure; and FIG. 23 is a top plan perspective, partly in section, of the handle latching structure and pin.

DESCRIPTION OF THE PREFERRED EMBODIMENTS

Figure 1:
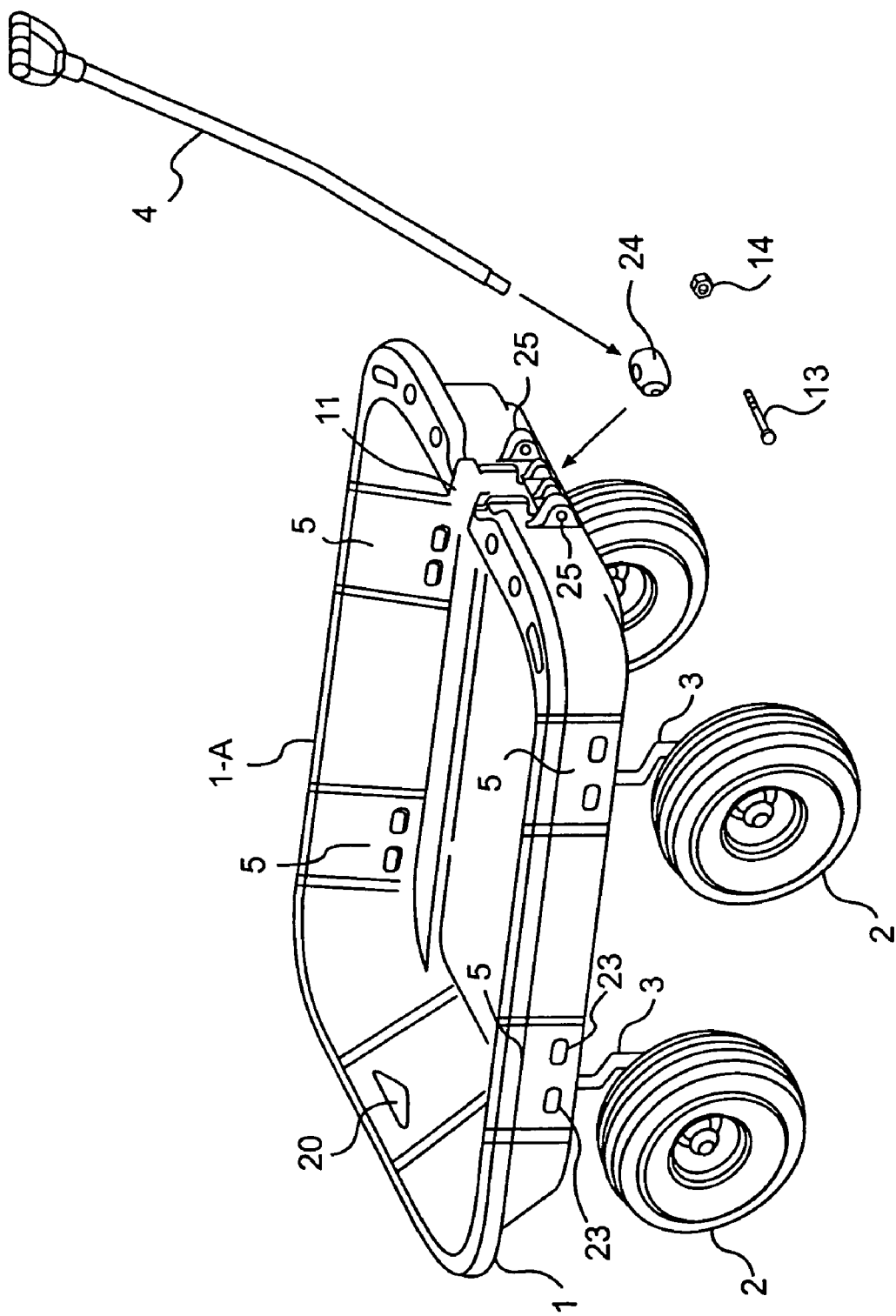
FIG. 1 is a side, slightly elevated perspective view of the wagon or cart device 1-A.
Figure 2:
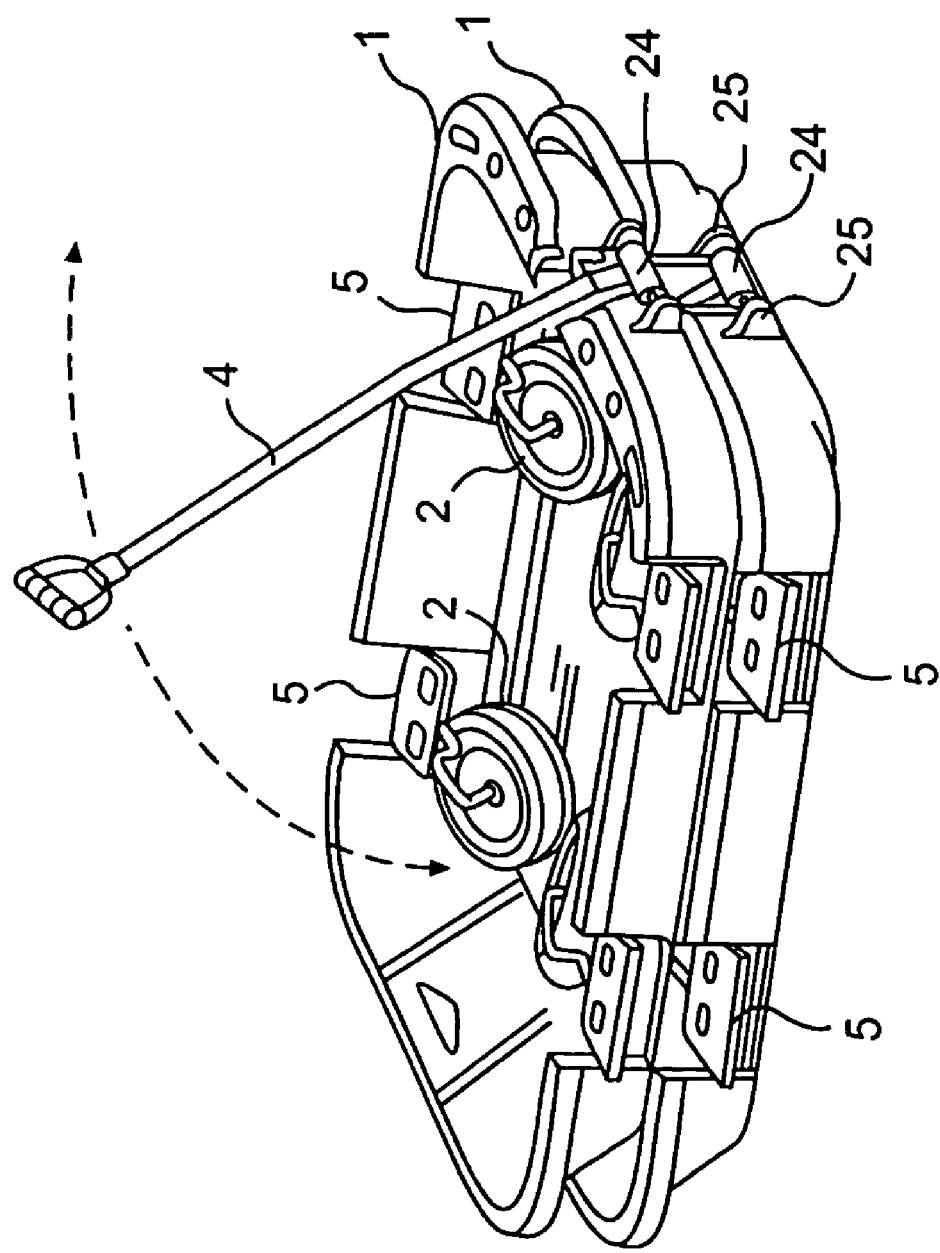
FIG. 2 is a side, slightly elevated perspective of two wagon devices in a stowed and nested perspective and is the preferred cover page figure.

FIGS. 1 through 3-A show the essential components of a compact wagon with folding wheels and handle, denoted 1-A, which in this particular embodiment includes four wheels (although it is assumed that variations may include 2 or 3 wheels, and may include "carts" with non rotating wheels and a fixed handle). The embodiment in FIGS. 1 through 3-A includes a base or chassis including formed stub walls made of any suitable material, including any type of plastic. The wagon itself is indicated as 1, which includes four tires, 2, suitable axles, 3, a handle, 4, and the innovative pivoting wheel assemblies 5, which each may include two finger/access holes, 23, which the user uses to latch and release each pivoting wheel assembly, 5, between an operative and a stowed position which is further seen in FIG. 2 (stowed). In this embodiment, the handle, 4, is received within a recess or cavity inside a handle retention pivot, 24, which pivot is then mounted between handle bolt retaining protrusions, 25, which protrusions are molded or shaped to the exterior of the handle-side exterior end wall profile. Accordingly, the handle, 4, in an operative position, may be utilized by a user to pull or push the wagon device, but the innovations include provisions for pivoting and stowing the handle. First, an access panel for the pivoting handle may optionally be included as shown at 11 in FIG. 3 only. Such an access panel may pivot along a portion of the base, closest to the handle end, and pivot and stow flush along suitable recesses or a cavity in the upper edge of the base of the wagon device, 1. Alternatively, the access panel, 11, may be omitted entirely and the handle, 4, may simply pivot freely back and into the base to be stowed along the parallel profile just above the base of the wagon device as indicated in FIG. 2. A handle coupler bolt, 13, travels through the handle bolt retaining protrusions, 25, through a suitable opening in the handle retention pivot, 24, through another suitable protrusion, 25, and then a nut captures the bolt, thus holding the handle along the exterior forward base wall, as shown in FIG. 1. FIG. 1 also includes a recess in the end wall opposite the handle end, which may be used to grasp the wagon but, more importantly, may be used to support the device on a wall hanging hook. Referring to FIG. 2, two of the compact wagons are shown in the nested position with all of the wheels, 2, pivoted 270° and stowed wholly within the wagon base. Also, each of the compact wagon's handles are pivoted and stowed generally parallel and just adjacent to the uppermost edge of the middle of the wagon base. It is understood that various handle configurations may be adapted to this compact wagon, and this embodiment shows a central pull handle. Instead a u-shaped handle may be instead adapted to pivot out from a securement point in any suitable part of the side walls, where it may be stowed adjacent to or following the perimeter of the wagon device either inside or just above the stub walls, and it may be pivoted out to allow it to be used as a pull handle. In operation, the set of wheels nearest the handle, are 360° rotatable, and the rear set of wheels are normally fixed against rotation.

FIG. 3 shows an exploded view of several of the parts already described in FIGS. 1 and 2, and also adds several others. Each of the pivoting wheel assemblies, 5, are shown exploded from the wagon device, and one of the demonstrative wheel assemblies is shown to include bilateral pivoting wheel pivot cylinders, 6, which are found on each wheel assembly, 5, but only depicted on one wheel assembly in the illustrated figure. The bilateral pivoting wheel pivot cylinders, 6, mount within suitable openings in the pivoting wheel assembly cavities, 16, and each pivoting wheel assembly, 6, also includes bilateral pivoting wheel assembly latches, 7, which are spring-biased within the pivoting wheel assembly, 6, and as can be further seen in FIG. 3-A, the latches, 7, fit within the pivoting wheel assembly latch receiving cavities, 17, a pair of which are mounted within the aforesaid cavity, 16, although a simple latch may be employed. Referring further to FIG. 3-A, the pivoting wheel assembly, 5, and its axle, 3, are shown in a stowed position, and in a ghost view, the outline of the pivoting wheel assembly, 5, may be seen in the operative view. Importantly, FIG. 3-A also shows that when the pivoting wheel assembly, 5, is pivoted 270° to the stowed position shown, a portion of the pivoting wheel assembly latch, 7 (shown in FIG. 3), springs outward into a pivoting wheel assembly stowed position receiving cavity, 18 (seen in FIG. 3-A). In this manner, the pivoting wheel assembly latch, 7, not only serves to latch the pivoting wheel assembly in the operative position, but the fingerlike upper portion of latch, 7, also springs outward into the receiving cavity, 18, to lock and latch the same wheel assembly in the stowed position within the side elevational profile of the compact wagon device.

Referring back to FIG. 3, several other details are shown which include another view of the optional access panel, 11, for the pivoting handle, 4, and an access panel base retention cavity or recess, 12, which is formed from the base floor of the device as well. As discussed later in FIG. 5, the compact wagons may also be coupled in tandem or multiple units, and for this purpose, the device may include a pivoting handle end coupler, 8, and a non-handle end coupler, 9, which are pivotally mounted to the underside of the wagon at their respective ends. In FIG. 3 is shown that coupler, 8, actually pivots under the base floor when stowed, and pivots out approximately 180° into an operative position and is held in place by the same handle coupler bolt, 13, and its nut, 14, or may be held by separate pin, 10, such as would hold the non-handle end coupler, 9, as also shown. Suitable recesses may be placed in the base of the compact wagon as shown at 19, primarily for beverages. And the recesses shown at 21 and 22 may have the multiple purpose of having a shaped recess in a flattened portion of the compact wagon stub wall lip, 40. Shaped generally rectangular recesses, 21, may fit box-like beverage holders and further smaller pass-through openings within the same general recesses may allow small garden tools to pass through the complete openings. 22 are cylindrical recesses for round beverages, with another rounded smaller openings to hold small garden tools.

Figure 4A:
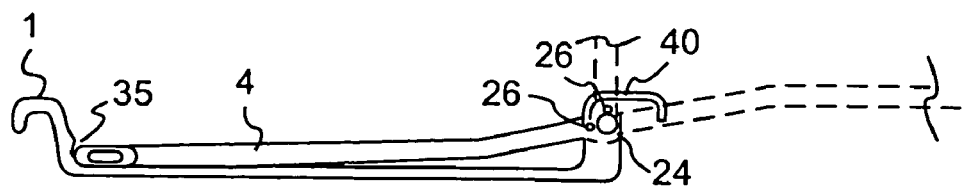
FIG. 4 is a top plan perspective of the device 1-A, with components in the stowed position.
Figure 4:
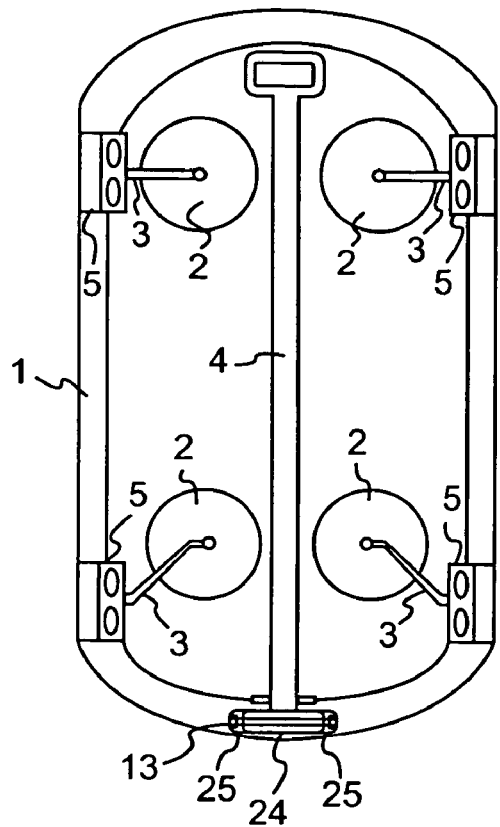

FIG. 4 is similar to FIG. 3, showing the top plan view of the wagon device, but in FIG. 4, the parts are not exploded but instead stowed within the confines of the compact wagon perimeter. Each of the parts shown have been previously described in FIG. 4; however, in this view, the handle retention pivot, 24, can be seen outside the handle side front or end wall, and is mounted by the bolt, 13, which travels within suitable shaped protrusions, 25, on either end of the pivot, 24. However, reference to FIG. 4-A shows that in this embodiment, the pivot, 24, is essentially mounted nearly within the profile of the handle side end wall, and the pivot point is essentially under the forward lip, 40. The handle is shown in the stowed position generally parallel and flush with the upper edge of the compact wagon base. Two different methods are shown for retaining the stowed handle, 4, in the position shown. First, a suitable protrusion may be molded in the inner aspect of the compact wagon, 1, end wall as shown at 35. This may resiliently retain the handle in the stowed position. Alternatively, detentes, 26, may be formed on opposite ends of the handle retention pivot, 24, which are captured in suitable recesses shaped within the wagon end wall immediately adjacent to either side of the handle retention pivot, 24 (no specific view is shown of the recesses which capture the detentes, 26). In this manner, the handle may be retained in an intermediate position generally pointing upward as shown in one of the ghost perspectives in FIG. 4-A or the user may overcome the pressure of the detentes and further stow the handle generally flush with the base floor. Of course, the handle may be fully pivoted out also to the operative position. Alternative methods of providing for the intermediate or stowed position of the handle are described in FIGS. 6-A through 6-D later in this application.

Figure 5:
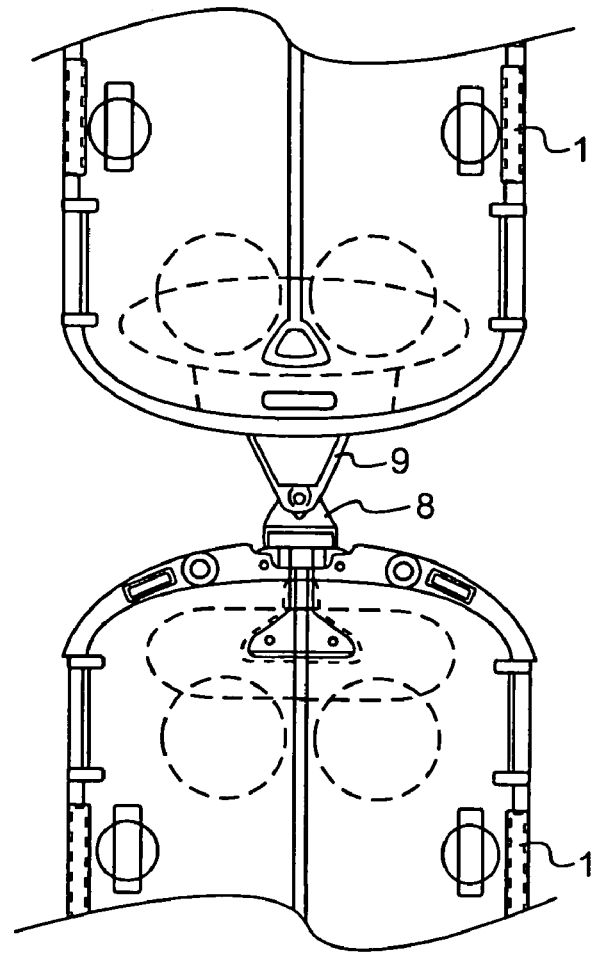
FIG. 5 is a top plan view of a part of two wheeled devices, 1-A, showing such devices coupled.
Figure 5A:
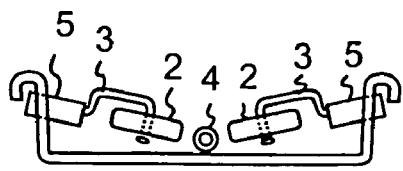

FIG. 5 shows a broken away view of two wagons coupled by suitable interconnection between couplers 8 and 9 which have been pivoted out from the underside storage position under each wagon. Any suitable method of protrusion and matching recess, or male and female connection may be employed to resiliently join the couplers. One of the couplers, when pivoted out, may double as a wall hook receiving member. The view also shows the optional handle access panel, 11, described earlier, in a stowed position.

FIG. 5-A shows the manner in which two pivoting wheel assemblies, 5, are stowed within the compact wagon and in this view from the end wall, cross-sectionally, the center pull handle, 4, is also seen. Depending upon the size of the tires, 2, and the height of the stub walls, each of the wheels may be latched or locked in the stowed position at any particular suitable angle to the stub wall. Alternatively, the wheels, 2, may partly or fully sandwich or overlay each other by being offset (not shown). Also, the handle, 4, may stow under or over the stowed wheels (not shown).

FIGS. 6-A through 6-D are directed at innovations which permit the pivoting handle to have a convenient intermediate position whereby the handle, 4, is conveniently maintained in an upright position, and a further stowed position where it is resiliently maintained generally parallel and closely adjacent to the upper face of the base of the wagon device. Referring first to 6-A, this figure shows an exploded view of the handle, 4, and handle retention pivot, 24, previously discussed, as well as the handle bolt, 13, and handle nut, 14. What is now shown is an additional handle detente/protrusion sleeve, 36, which is generally cylindrical and may be mounted around the exterior of the handle, 4, butt, or alternatively, mount inside the handle, 4. In either case, the handle detente/protrusion sleeve, 36, includes up to two handle sleeve protrusions, 37. When constructed, the handle protrusion sleeve, 36, is mounted inside or outside the butt end of the handle, 4, and each of the sleeve protrusions, 37, protrude outward from the preferably cylindrical handle which instead itself may be shaped, with integrated protrusions, or with a shape which resiliently holds on the facing stub walls in one axis, but when turned to another axis can pass through said walls to stow flush with the base. A pair of protrusion sleeve bolt receiving openings, 41, travel through said protrusion sleeve and once the sleeve is placed around or inside the butt end of the handle, 4, both units are then placed inside the handle retention pivot, 24, and then the entire unit is secured by the bolt, 13, which also travels through suitable protrusions or openings in the end wall of the wagon (not shown here in 6-A). As shown in FIG. 6-B, there is also an elongated handle bolt opening in the handle, 4, butt end, and for purposes of illustration, the handle bolt, 13, is shown which has permitted movement along the elongated hole, 38, and one such elongated hole is on either end of the handle butt end. FIG. 6-C simply shows the bolt, 13, passing through the elongated hole, 38. Last in this series, FIG. 6-D is intended to show all of the aforesaid parts mounted in the end wall of the compact wagon, 1. And particularly, when the user desires to pivot the handle into an out of the way, generally upright intermediate position, the handle detente/protrusions, 37, are retained within handle protrusion wagon wall receiving surfaces, 42, which serve to hold the handle in an upright position. To overcome this intermediate position, this embodiment allows the user to engage in one of two separate actions in order to then pivot the handle, 4, down into the fully stowed position along the base floor. First, the user could grasp the handle, pull it slightly away from the wagon wall in the direction outside the wagon base and then rotate the handle, 4, a quarter turn and then pivot the handle once again toward the wagon base so that the handle sleeve protrusions, 37, do not contact the handle protrusion wall receiving surfaces, 42, allowing the handle to clear the handle pivot wall opening, 43, effectively allowing the handle to pivot freely into the stowed position along the base floor. Alternatively, the same design described, which includes the handle detente/protrusion sleeve, 36 (shown in FIG. 6-A), may be constructed so as to allow "play" and resilient movement of the handle detente/ sleeve protrusions, 37, and if this is the case, the user need not rotate the handle a quarter turn in order to overcome the resilient upright handle position and instead may simply push and force the handle through the opening, 43, shown in FIG. 6-D to fully stow the handle along the base floor. FIG. 6-D further shows the stowed position of the wagon coupler, 8, whereby it is mounted with suitable pins, 10. When the user desires to use the coupler, it would be pivoted about 180° out from the underside of the wagon.

Figure 7:
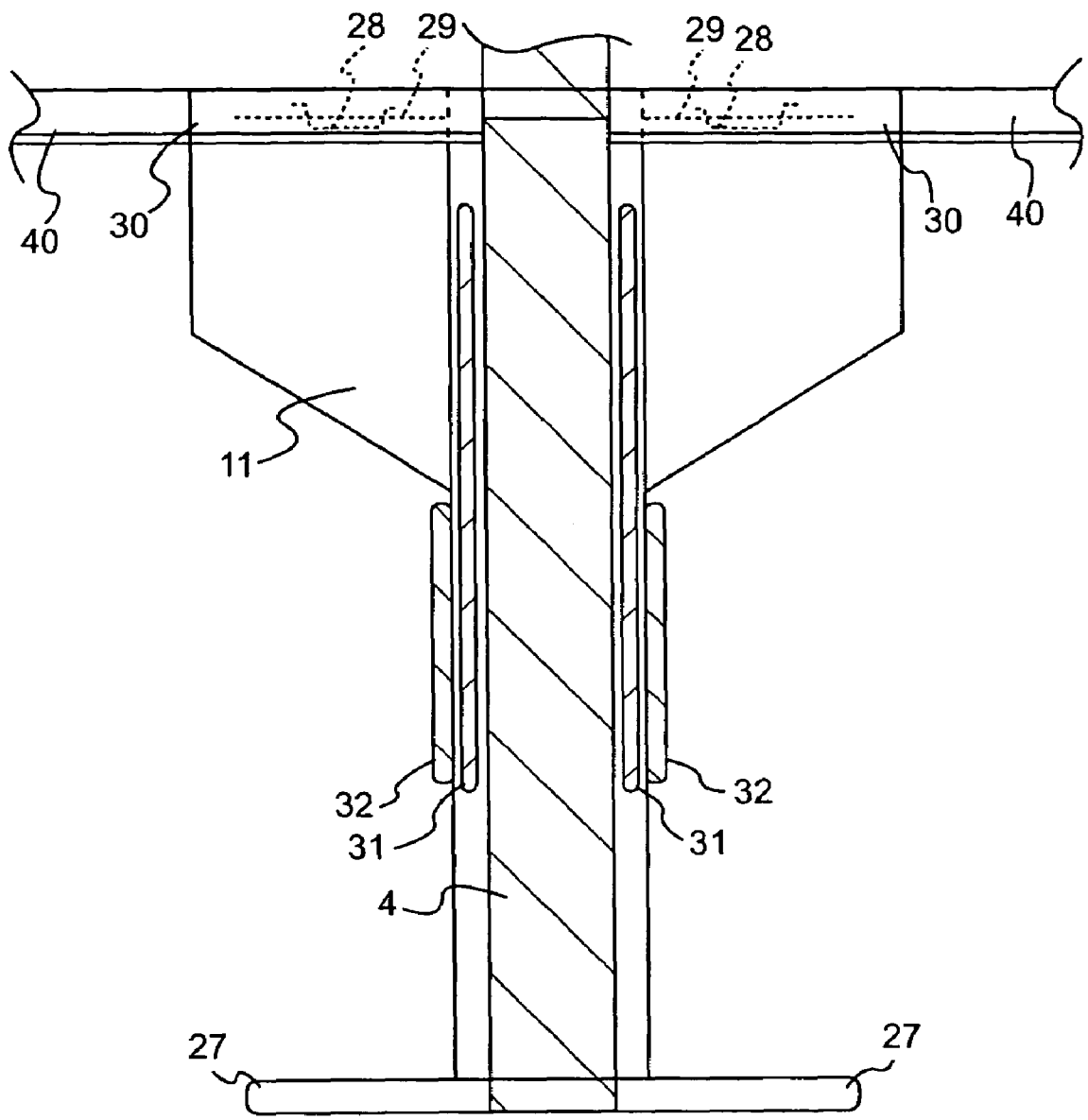
FIG. 7 is an end elevational view of the access panel components of wheeled devices 1-A, isolating certain components.
Figure 8:
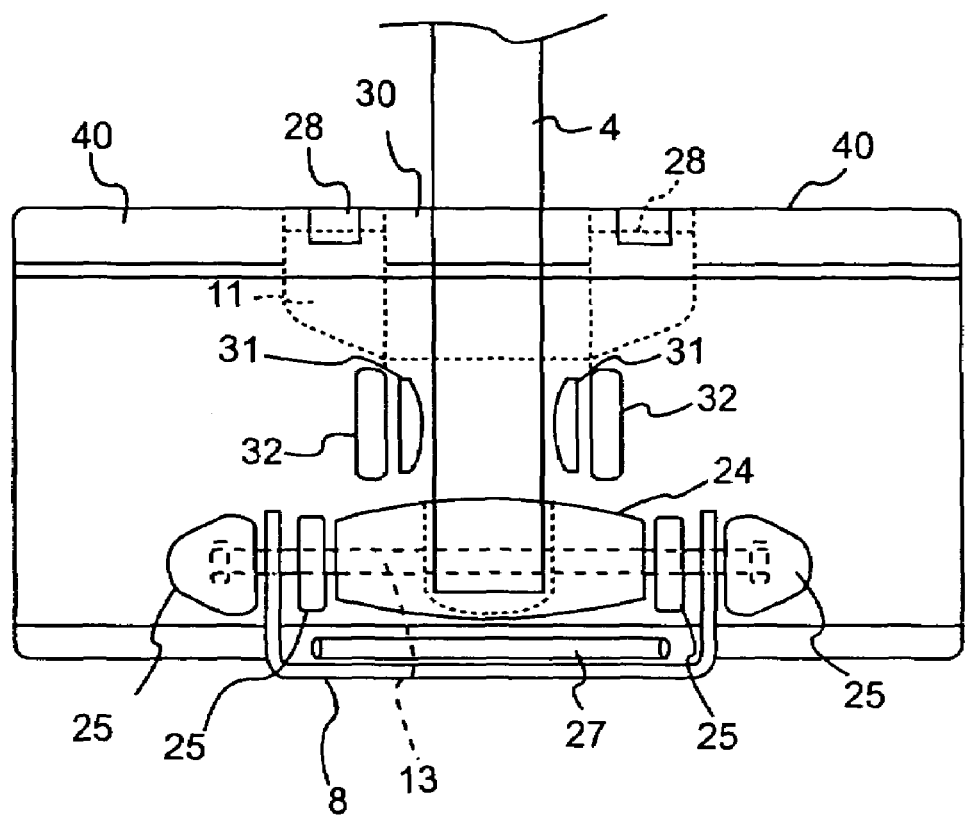
FIG. 8 is an end elevational perspective of the wheeled device 1-A isolating certain handle and coupler components.
Figure 8A:
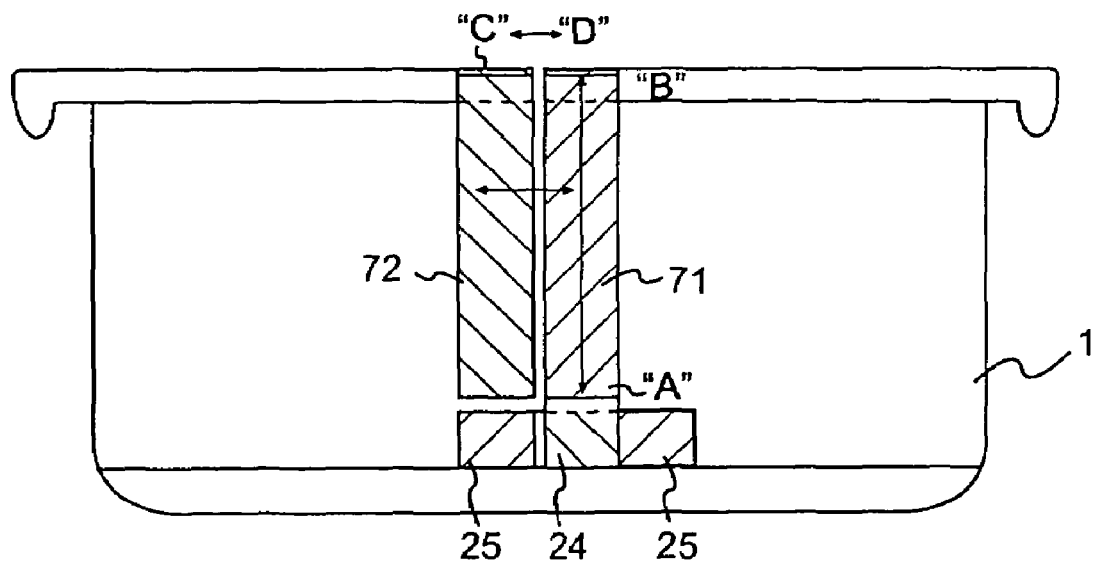

FIGS. 7 through 12 all address an alternative embodiment of the compact wagon, 1-A, which also includes an access panel, 11, as shown in FIG. 7. The purpose of the access panel is to have the continuity of a complete interior wagon stub wall in the area adjacent to the pivoting handle, rather than an opening or gap to allow for the pivoting of the handle (which opening, 43, was described earlier and is particularly shown in FIG. 6-D). The preferred embodiment of the access panel provides that it is mounted with an access panel pivot/retainer, 27, which are ears or extremities at the foot of the panel, 11. Not shown in FIG. 7 is that the extremities, 27, would interfit resiliently in a suitable cavity in the wagon wall base, allowing it to be resiliently snapped into placement from inside the base. FIG. 8 places the access panel in perspective in the views from outside the wagon wall looking in the direction toward the interior of the wagon from the exterior. In FIG. 8, the access panel is in its operative position where it simulates a continuing wagon wall and is pivotally held in position at its uppermost portion by an access panel lip, 30, which is of a similar dimension and profile as the adjacent or contiguous wagon wall lip wall, 40, as shown in FIGS. 7 and 8. Suitable portions of the access panel, 11, lip protrusion, 28, travel over and resiliently retain on top of the wagon wall lip, 40. As can be seen more clearly in FIG. 11 when the access panel is snapped into placement, it interfits over wagon wall lip, 40, and two or a other suitable number of access panel lip protrusions, 28, resiliently snap into wagon wall lip openings, 29, as seen in FIG. 11 and in FIG. 7. Further, the access panel, 11, includes a pair of access panel handle retainers, 31, which are shown more clearly in FIG. 10 and FIG. 12. As shown in FIG. 12, the access panel handle retainer members, 31, also are held in place by matched wagon wall access panel retainers, 32, formed from a portion of the exterior of the wagon end wall. FIG. 12 further shows that when the access panel, 11, is in the operative and upright position, where it simulates the wagon end wall, when the handle is pivoted into an upright position, the handle, 4, is maintained in position by the access panel handle retainer, 31.

FIG. 8 shows a complete view of all of the handle retention components as well as the access panel components maintained in a position where the handle is in an upright position retained by the access panel handle retainers, 31, which themselves also resiliently interfit with the access panel retainers, 32. FIG. 8 also shows that the handle end coupler, 8, may be mounted along a portion of the same handle bolt, 13, instead of with separate pins.

FIG. 8-A is an end view showing two alternative access panel embodiments for the handle end wall of the wagon device 1. The handle pivot 24, and the handle retaining protrusions 25, are shown for perspective, though the handle is omitted. A upward sliding handle access panel 71 also entirely slides and retracts downward into the device base, as indicated by the letter "A". When this panel is operative, it is slid upward as indicated by "B" where it provides a simulated flush wall appearance. In another sliding access panel variant, shown at 72, the same type access panel instead slides laterally, such that the letter "C" indicates the retracted, hidden position, and the letter "D" indicates the operative, laterally slid position. In either sliding embodiment, the panel may be recessed in whole or part within the cart base profile. When the panel is in its operative or even in a stowed position, it may include protrusions or recesses which cause resilient contact with the handle to retain it in either an intermediate, upright position, or in a stowed position (not shown).

Figure 9:
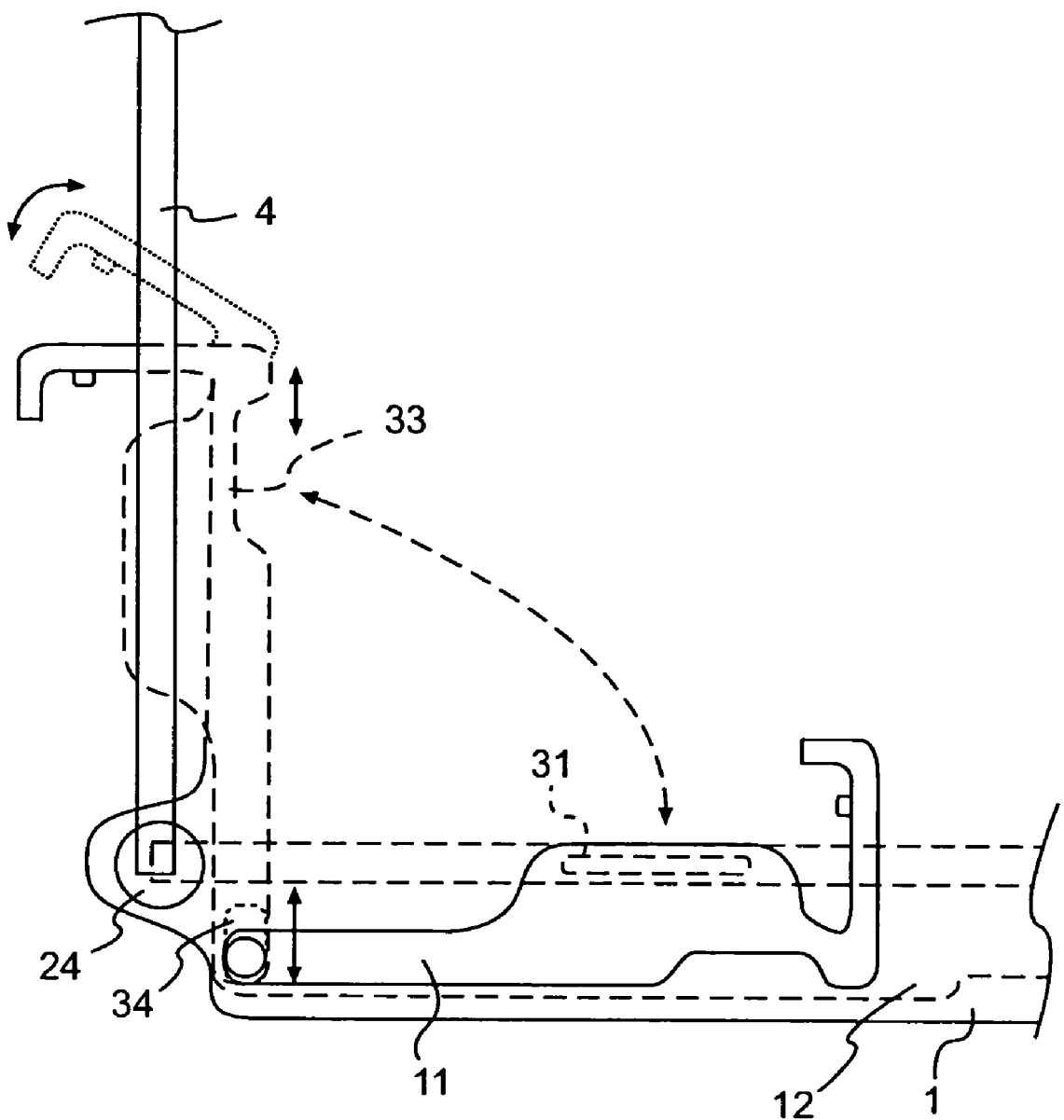
FIG. 9 is a side elevational perspective, partly in cross-section, of wheeled device 1-A focusing on the handle and access panel components.

FIG. 9, also in this series, demonstrates a profile showing the access panel, 11, in a stowed position along the compact wagon base and particularly in a matching cavity or recess, 12. The handle, 4, shown in FIG. 9 in an upright position, but also in a ghost view, the handle is pivoted and shown parallel to the wagon base, where it is again maintained within the bilateral access panel handle retainers, 31. FIG. 9 indicates in ghost view how the access panel, 11, may be then pivoted and raised 900 by the user because it is mounted in a slightly elongated access panel pivot cavity, 34. The elongated cavity, 34, allows the user to slightly raise the access panel when it is lifted into its operative position where it can resiliently snap over a matching portion of the wagon wall lip, 40 (as shown in other figures). As is shown in FIG. 9, there is also included a finger grip or cavity, 33, which provides for the user to have a gripping portion of the access panel when manipulating it. Also FIG. 9 shows the handle retention pivot, 24.

Figure 13:
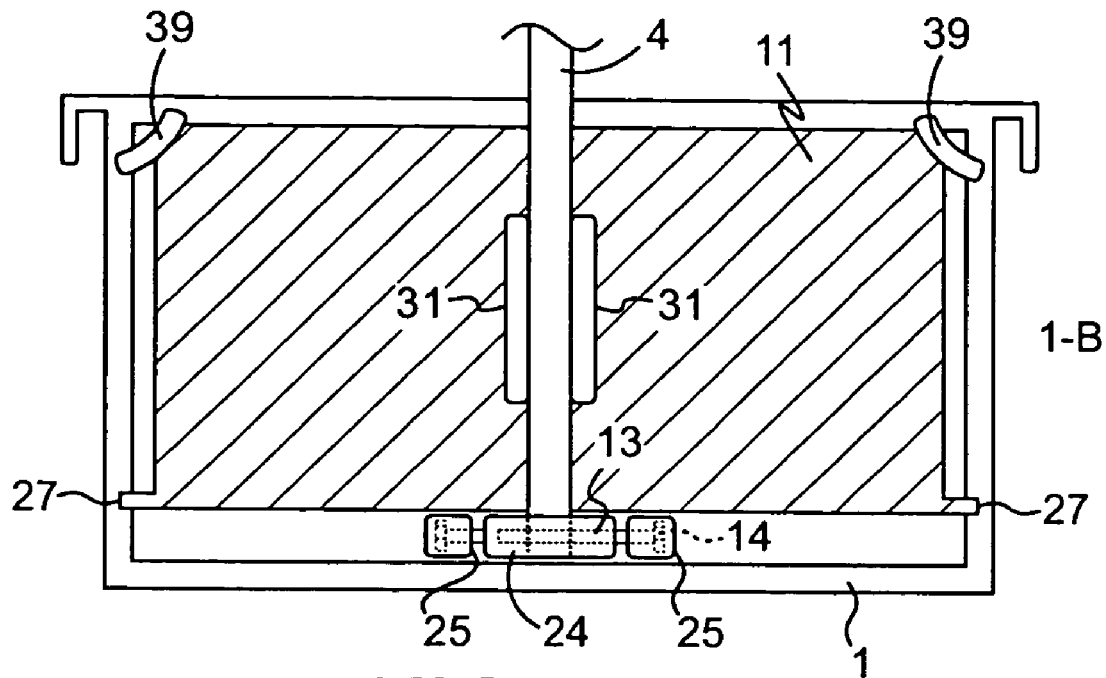
FIG. 13 is an end elevational view, a variation of the wheeled device denoted 1-B, focusing on the handle and access panel components, including a different embodiment of the access panel.

FIG. 13 shows an alternative embodiment of the access panel, 11, which essentially comprises the entire end wall closest to the handle retention location. All of the other components indicated in FIG. 7 through 12 are the same as shown in FIG. 13 with the exception of the access panel comprising essentially the entire end wall nearest to the handle. The other additional element is that suitable portions of the access panel alternative embodiment shown here may include projection openings or cavities to receive any suitable protrusion, 39, molded in a portion of the inner aspect of the side walls so that when the access panel is in upright operative position, it is resiliently maintained.

Figure 14:
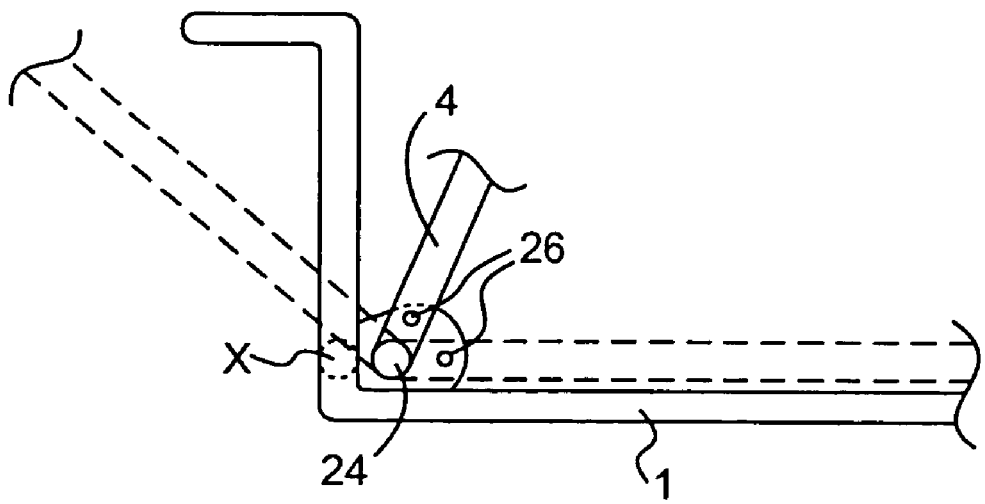
FIG. 14 is an alternative embodiment of the wheeled device, indicating alternative locations for the handle retention position, and is a side elevational profile, partly in cross section.

FIG. 14 shows alternative handle retention locations on the compact wagon, 1. Here in FIG. 14, in this alternative embodiment, the handle retention pivot, 24, is maintained in the inner aspect of the compact wagon base very close to the end wall, and the handle is pivotally mounted so that it stows flush or parallel with the wagon base, and again may be pivoted out through an opening in the end wall (not shown here) so that the user may pull the wagon by the handle, 4. The "x" in FIG. 14 indicates an alternative handle retention location essentially flush within the profile of the end wall.

Figure 15A:
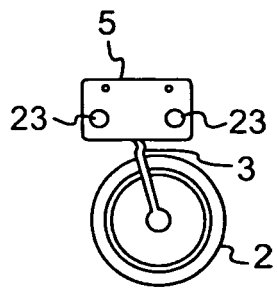
FIG. 15-A is a side elevational profile of the wheel assembly and wheel, with a detached perspective.
Figure 15B:
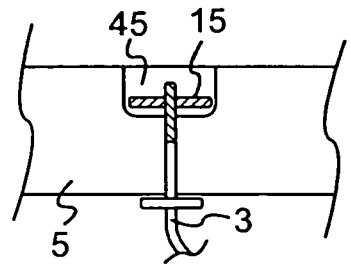
Figure 16A:
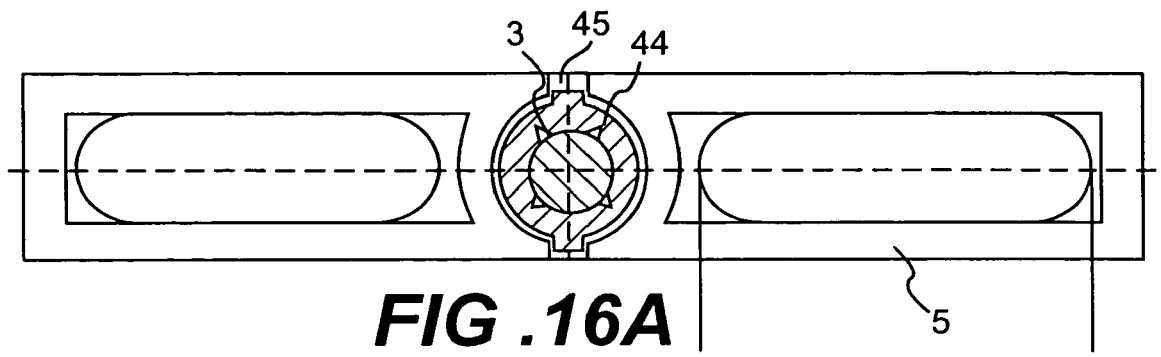
FIG. 16-A is a top plan perspective of the wheel assembly.
Figure 16B:
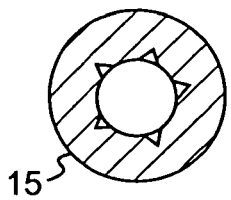
Figure 16C:
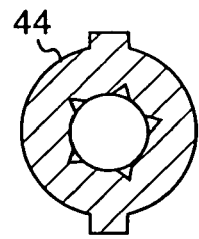
Figure 16D:
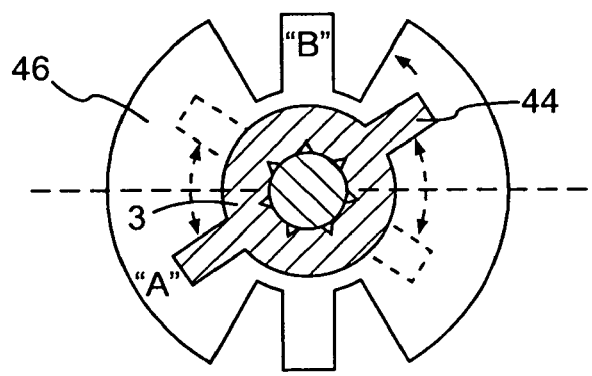

FIGS. 15-A through 16-D address details of the unique fixation, rotation, and limited axial rotation methods for the wheel axle of the inventions. The methods are achieved by interplay between the axle end caps/nuts and a shaped cavity of the wheel assembly cavity surrounding the end cap/nuts. FIG. 15-A shows a wheel assembly embodiment 5, tire 2, wheel axle 3, and the finger access holes 23. FIG. 15-B indicates the upper portion of the axle 3, traveling through the wheel assembly 5, the wheel assembly cavity 45, and a washer or end nut 15 forced onto said axle 3. FIG. 16-A is a top plan view of the same wheel assembly 5 depicting a wheel assembly axle cavity 45, through with the upper portion of the wheel axle 3 extends, and in the cavity 45 is forced, preferably, a specially shaped inside threaded nut or cap 44. In this embodiment, the washer 44 (also shown in FIG. 16-C) is shaped with two protrusions, which extend into matching cavities as indicated in FIG. 16-A. FIG. 16-B shows round inside threaded washer 15, and if this washer is placed in the same cavity shown in FIG. 16-A, then the axle 3 (and associated wheel) is allowed 360 degree rotation, such as may be preferred on the forward pair of wheels on a wagon, though the rear pair of wheels may be fixated with the specially shaped washer, though the same wheel assembly cavity may be employed. FIG. 16-D isolates a wheel assembly axle receiving cavity 46 of yet another shape, designed to allow less than 360 degree rotation, which may be preferred in some applications. The end cap/nut 44 is rounded, with two elongated protrusions. When the end cap 44 is in the larger cavity indicated a "A" it may rotate axially with limited movement, but if the end cap protrusions of end nut 44 is instead forced into the cavity indicated at "B" the axial rotation of the axle 3 is eliminated.

Figure 17A:
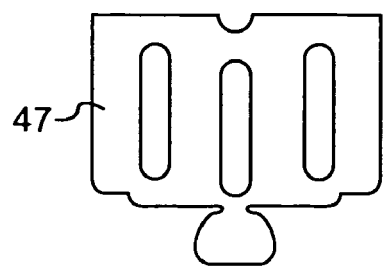
FIG. 17-A is a side elevational perspective of the sleeve accessory.
Figure 17B:
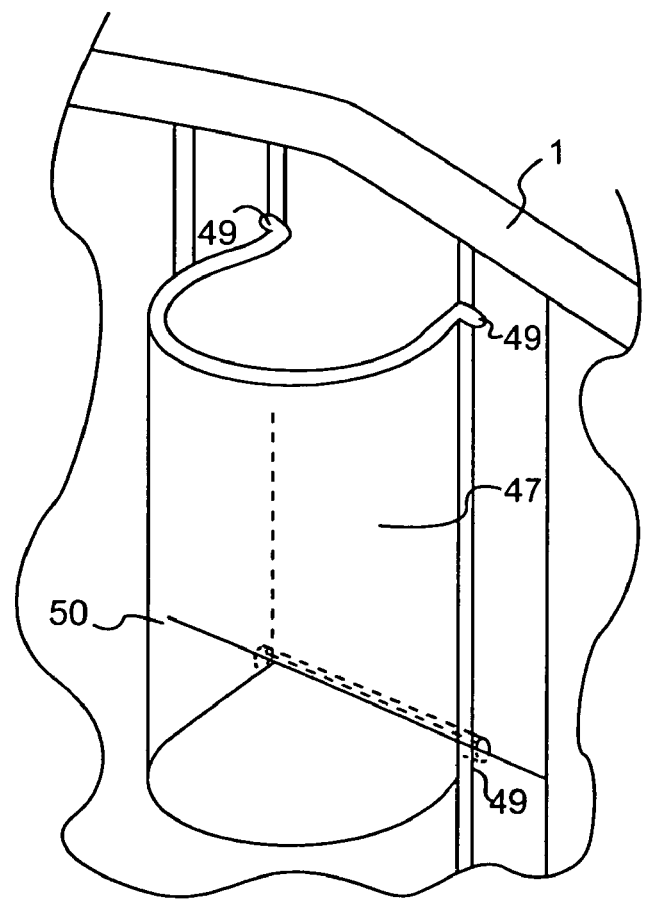
Figure 17C:
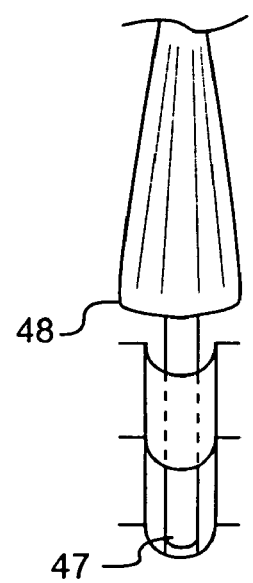

FIGS. 17-A to 17-C depict the sleeve accessory 47, which is first shown at FIG. 17-A, and is resiliently pressed into a half moon shape as seen in FIG. 17-B and is pressed through suitable stub wall recesses 49 (or alternatively, protrusions) and the bottom may be formed by folding same where it also may also be retained against the stub wall of the wagon 1, abutting lateral ribs and being secured with either cavities or protrusions 50. Last, in FIG. 17-C an implement (here, an umbrella 48) may be held in the sleeve 47, as well as any tool, fishing rod, beverage, etc. The bottom "floor" portion of the sleeve accessory may be broken away or omitted should a very elongated handle or rod accessory be placed in the product.

Figure 18:
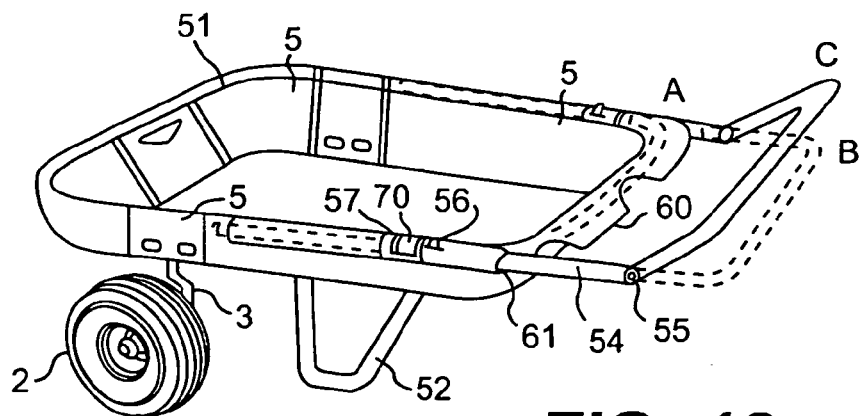
FIG. 18 is a side elevational perspective, elevated, of a carrier device embodiment 51.
Figure 18A:
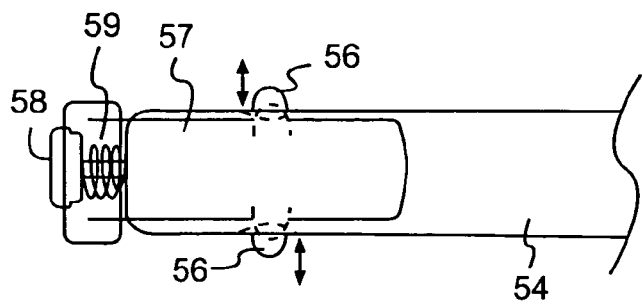
Figure 18B:
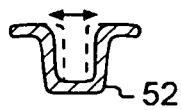
Figure 18C:
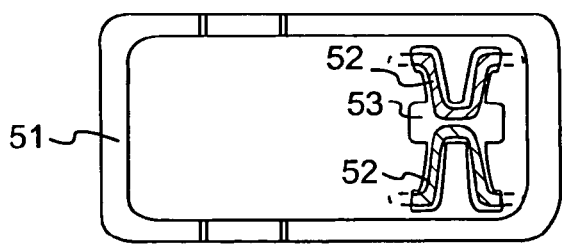
Figure 18D:
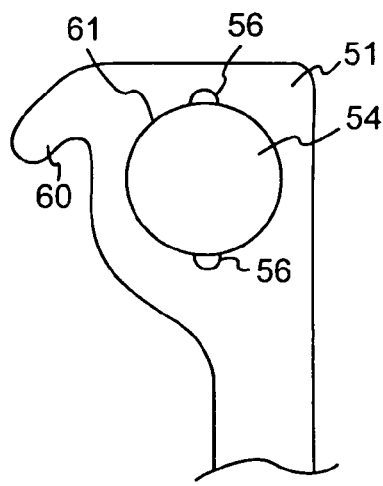

FIG. 18 to 18-D address an alternative carrier device, denoted 51, which as shown is a two wheel cart (but which may instead be a single wheel wheelbarrow with central forward wheel, using a pivoting or movable wheel axle assembly as disclosed here and in the inventor's original or continuation application). Referring to FIG. 18 this cart may include a pair of opposing stowable wheels 2, connected by an axle 3, to pivoting wheel assemblies 5, which form an integral part of the cart's formed stub walls. Not shown, is that the wheels pivot in to the device base, in a stowed, latched position wholly within the cart stub wall's periphery. The rear, handle end of the cart is supported on a pair of underside supports, one shown at 52. A U shaped handle 54 is slidably disposed within a cavity 61 on either side of the cart device. When the handle 54 is fully stowed, it occupies the position shown at "A" in FIG. 18, where it is resiliently retained by a suitable shape in the stub wall lip 60. Said handle may be either a one stage unit, or may be a two or more stage telescoping unit.

In operation, the user pulls the handle, 54, from its stowed position partly or wholly under the lip, 60, within a cavity area, 61, until it is extended to the position shown in ghost outline at "B". The handle may be of two stages, and telescope (not shown) and the handle grasping end may pivot and latch in various positions, such as that shown at "C", by virtue of an adjustable dial or latch and release 55. Referring to FIGS. 18-A and 18, one or more detentes, 56, are mounted through a handle end cap unit, 57, mounted in the handle, 54. At the terminus of the end cap there is a push button, 58, which is spring biased against spring, 59. When the handle is slid out to the operative position one or more detentes, 56, spring out of the cavity, 61, as shown in FIG. 18, although the cavity or opening which permits the detent to engage may be instead hidden within the cavity, 61. Also, a second cavity or opening, 70, is shown. When the handle is fully extended, the detente, 56, engages outward and limits the travel in either direction, and also the end cap, 57, may be of an enlarged circumference and size, which may reach the cavity opening, 70, to limit travel and handle extension. To retract the handle, 54, the user presses the handle end cap, 58, which is accessible through the handle cavity opening, 70. FIG. 18-D shows one embodiment shape for the cavity, 61, handle, 54, and detentes, 56, in the carrier device, 51, wall, which includes a shaped lip, 60.

FIG. 18-B and 18-C show the underside support 52, two of which preferably are mounted within shaped cavities 53 molded or shaped in the wagon, 51, underside (instead a single support may be mounted transversely, but is not shown). Each support is forced into its cavity, and when each support 52 is erected, any suitable shape in the cavity or the support serve to retain the perpendicular erected position, not shown here but partly shown in FIG. 18.

Figure 20:
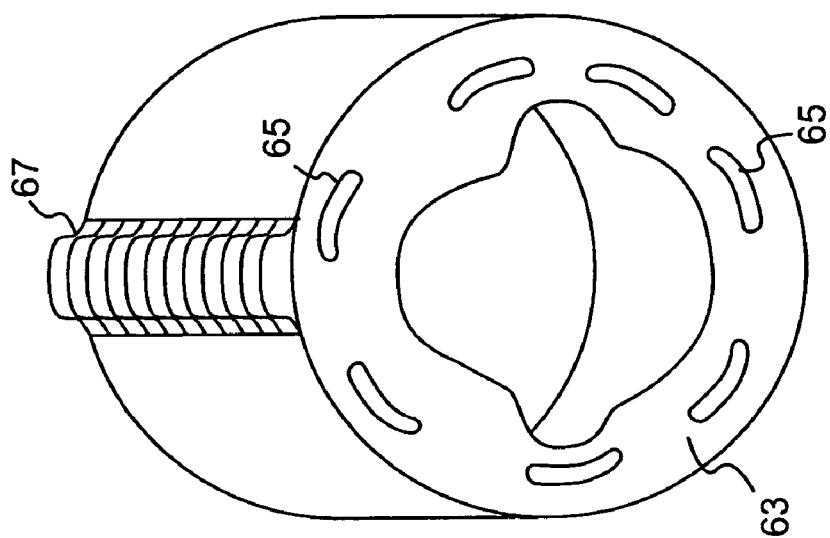
FIG. 20 is a detached perspective showing details of the handle latching ring.
Figure 19:
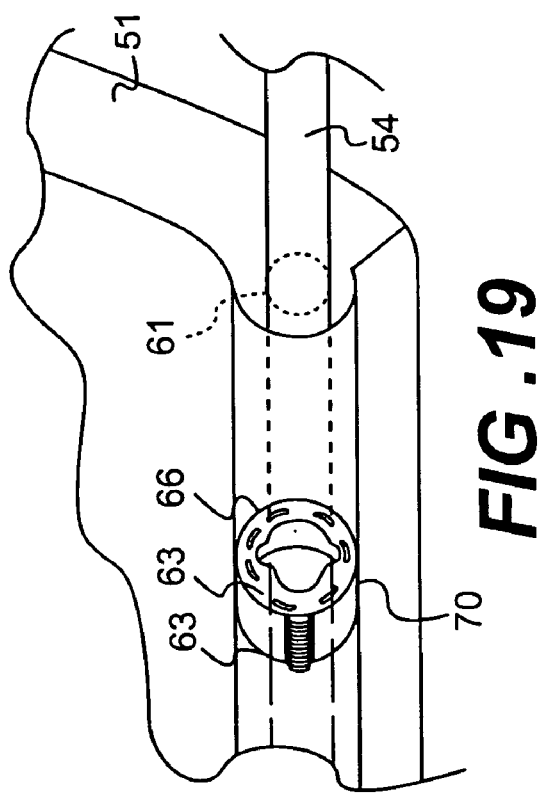
FIG. 19 is a side elevational perspective, elevated, of the carrier device embodiment.
Figure 21:
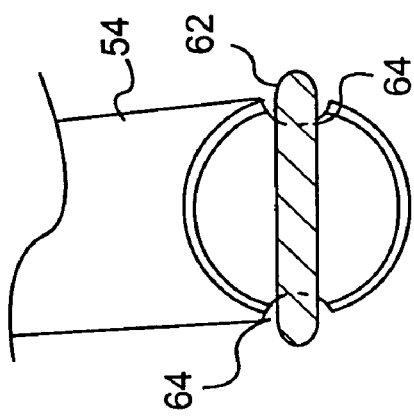
FIG. 21 is a partly broken away cross sectional view of the handle of device 51.

FIGS. 19 to 23 detail an alternative embodiment for the handle latching mechanism of the carrier device 51, which latching mechanism is utilized when the handle is slid to its operative position. The same carrier device 51 as shown in FIG. 18 is altered as shown in FIG. 19 where the handle cavity, 61, has an opening, at 70. A handle latching ring 63, shown in FIG. 20, is forced into the handle cavity opening at 70 and resiliently maintained. The handle is placed into the cavity, 61, and through the ring, which ring may rotate about a ¼ turn. Subsequent to placement of said handle, 54, into the cavity, 61, a suitable pin, 62, with suitable protrusions is affixed to said handle in near proximity to its terminal end through any suitable access opening through the cavity, 61. This figure also shows the ring grasping protrusions, 67. Referring to FIG. 21 and also 19 and 20, the ring 63 is held into place in the stub wall facing wall recesses (discussed below) by protrusions 65 on either side, and the inner aspect of the ring includes shaped recesses to allow a pin, 62, which threads through handle pin through holes 64 in the handle 54. In operation, ¼ turn of the latching ring secures the handle pins within the inner cavity of the latching ring, effectively securing the handle against movement while in use. The user turns the rings a reverse ¼ turn to release and retract the handle. Suitable protrusions in the latching ring 63, when in conjunction with corresponding recesses in the facing walls 66, hold the latching ring in either the "latched" or "unlatched" positions (the protrusion and recess arrangement may also be reversed). Also, FIG. 22 shows that the pin or protrusions, 62, also serve as "guides" in the handle cavity, 61, during its travel through the cavity, 61.

FIG. 22 shows the handle 54, within the cavity 61, and indicates that when the handle is fully operative and extended, the threaded pin 62 reaches a terminus 69 within the confines of the latching ring 63. The same figure shows that the ring 63 is held in place around the handle 54, as well as by the ring's protrusions 65 which are shaped in an intermittent circular shape around the outer facing walls of the ring, and which then match with corresponding recesses, 66, in the inward facing portions of the stub walls (not shown). FIG. 23 then further shows that once the handle pin, 62, reaches its travel terminus, the ring, 63, may be partly rotated and that this rotation entraps the pin (latching the handle in place in relation to the carrier device) within the ring 63 inner cavity 68, and the ring is reverse rotated about ¼ turn to release the handle pin (whereby the user may retract the handle to a fully stowed position substantially within the perimeter of the carrier device).

Although the invention has been described above in relation to preferred embodiments thereof, it will be understood by those skilled in the art that variations and modifications can be effected in these preferred embodiments without departing from the scope and spirit of the invention.

What is claimed:

1. A wheeled carrier device comprising: a base member including a multiplicity of formed, upwardly projecting stub walls with a free upper edge, defining a side elevational profile and an outer perimeter; at least three wheels which provide rolling support to the base member of the carrier device; and a handle defining a formed grasping portion, secured to the carrier device; and
   at least three separate wheel assembly receiving cavities formed out of the device stub wall thickness, each cavity being defined by open space in the stub wall;
   at least three wheel assemblies, each wheel assembly including a plurality of support surfaces perpendicular to a base, defining a wheel assembly periphery and an interior cavity;
   the wheel assembly further includes both wheel assembly mounting means and wheel attaching means interconnected to at least one wheel;
   housed at least partially within the wheel assembly periphery are transversely disposed, oppositely extending mounting elements, which occupy adjacent portions of the carrier device base member, about which the wheel assembly pivots, and
   the at least one wheel includes an outer rim and a central hub, said hub including a transverse opening therein, and said wheel attaching means for the at least one wheel including at least one elongate wheel support element, said wheel support element including a transverse portion at a first portion received in said opening in said hub and forming an axle about which said wheel rotates, at least one uppermost portion extending orthogonally to said transverse portion and being affixed to the wheel assembly, said uppermost portion terminating in a second end, said wheel assembly including a terminal fixing means disposed proximate to the second end, which terminal fixing means secures said at least one wheel, and said elongate support element to the wheel assembly; and
   in the first operative position of the wheel assemblies each associated at least one wheel is orthogonal to the device base, the periphery of each wheel assembly substantially occupies one of said wheel assembly receiving cavities and at least one wheel rotates 360 degrees about at least one vertical axis defined by at least one elongate wheel support element supporting said at least one wheel, substantially below the underside periphery of the base, and
   in a second, stowed position of each wheel assembly, the outer stub wall profile is interrupted revealing a cavity, and each of the at least three wheels and their associated elongate wheel support elements are near to parallel with the device base, located within the device outer perimeter; and
   latching means which positively latch each wheel assembly against movement when in the first position, which latching means engages a portion of the carrier device base member and a portion of the wheel assembly.

2. A carrier device in accordance with claim 1, wherein at least a portion of one first carrier device base member nests at least partly within at least a portion of a contiguous second carrier device base member periphery when the wheels and handle of the first device are in their stowed positions.

3. A device in accordance with claim 1, wherein said handle is secured to the device base member in a position outside the plane defined by the inner perimeter of the stub walls of the carrier device, said handle including at least one butt end nearest to the end secured to the carrier device which is also movable from a first operative position, to a stowed position closely adjacent to the base member, substantially within the side elevational profile and outer perimeter of the carrier device, and in said stowed position at least part of said handle is positioned within an opening formed within a portion of the elongate stub wall, closest to the handle securing position, which elongate stub wall defines a plane, and said opening has two facing wall portions which are aligned substantially orthogonally to the elongate stub wall plane.

4. A device in accordance with claim 3, including handle retaining means near to said stub wall opening, the retaining means comprising at least one resilient connection between a portion of the handle at least near to the butt end and at least one surface near to said stub wall opening for resiliently retaining the handle in at least one further position, in addition to said first operative position, with a retention force which can be overcome by manual movement of said handle.

5. A wheeled carrier device comprising:
   a base member including a multiplicity of formed, upwardly projecting stub walls with a free upper edge, defining a side elevational profile and an outer perimeter;
   at least two wheels which provide rolling support to the base member of the carrier device;
   at least two separate wheel assembly receiving cavities formed out of the device stub wall thickness, each cavity being defined by open space in the stub wall; and
   at least two wheel assemblies, each wheel assembly including a plurality of walls perpendicular to a lower base portion, defining a wheel assembly housing periphery and an interior cavity; and each wheel assembly further includes both wheel assembly mounting means and wheel attaching means interconnected to at least one wheel;
   housed at least partially within the wheel assembly periphery are transversely disposed, oppositely extending mounting elements which occupy adjacent portions of the carrier device base member, about which the wheel assembly pivots;
   in the first operative position of the wheel assemblies each associated wheel is orthogonal to the device base providing rolling support, and the periphery of each wheel assembly housing substantially occupies the wheel assembly receiving cavity;
   in a second, stowed position of each wheel assembly, the outer stub wall profile is interrupted revealing a cavity, and the wheel attaching means and the interconnected at least one wheel of each wheel assembly are near to parallel with the device base, located within the device outer perimeter; and
   latching means which positively latch each wheel assembly against movement when in the first position, which latching means engages a portion of the carrier device base member and a portion of the wheel assembly.

6. A carrier device in accordance with claim 5, which includes a handle.

7. A carrier device in accordance with claim 5, wherein at least a portion of one first carrier device base member nests at least partly within at least a portion of a contiguous second carrier device base member periphery when the wheels of the first device are in their stowed positions.

8. A wheeled carrier device in accordance with claim 5, wherein the latch includes at least one finger actuated latch which engages a portion of each wheel assembly and the contiguous carrier device base member to selectively permit movement of the wheel assembly from said first operative position to the second, stowed position.

9. A wheeled carrier device in accordance with claim 5, wherein each of the at least two wheel assemblies include wheel attaching means with an uppermost vertical wheel support axle with means for fixating the uppermost vertical wheel support axle to the wheel assembly housing so as to prevent axial rotation of the vertical wheel support axle.

10. A device in accordance with claim 5, wherein the wheel attaching means of each wheel assembly include an uppermost vertical wheel support axle and a shaped surface of the vertical wheel support axle is of size and shape relative to at least one fixed surface of the wheel assembly, whereby axial rotation of said uppermost vertical wheel support axle portion is prevented.

11. A device in accordance with claim 5, wherein a vertically disposed portion of the wheel attaching means, in at least the first, operative position, include terminal fixing means attaching the wheel attaching means to the wheel assembly housing, the terminal fixing means being of size and shape relative to at least one fixed surface of the wheel assembly housing so as to prevent the wheel attaching means rotation, whereby axial rotation of said vertically disposed wheel attaching means is prevented and thus said at least one wheel is prevented from rotation about said vertically disposed uppermost portion.

12. A carrier device in accordance with claim 5, wherein not less than two of said carrier devices couple by virtue of interconnectors, each such interconnector being mounted to a respective carrier device, and one such carrier device handle controls rolling movement of at least two coupled carrier devices.

13. A carrier device in accordance with claim 6, wherein the handle is secured to the carrier base member at a position at least partly outside the plane formed by inner facing stub walls proximate thereto, and at least one handle receiving cavity is formed from said stub walls forming said plane, and at least a part of the handle is positioned within said opening in said stub walls in a second stowed position of said handle.

14. A wheeled carrier device comprising:
a base member including a multiplicity of formed, upwardly projecting stub walls, defining a side elevational profile and an outer perimeter; at least three wheels which provide rolling support to the base member of the carrier device; a rigid, elongate push and pull handle defining a formed grasping element, secured to the carrier device in a position outside the plane defined by the inner perimeter of the stub walls of the carrier device, said handle including at least one butt end nearest to the end secured to the carrier device which is also movable from a first operative position, to a stowed position wherein at least part of said handle is positioned within an opening between facing portions of said stub walls, closely adjacent to the base member, substantially within the side elevational profile and outer perimeter of the carrier device and when occupying the said stowed position, at least a part of the handle being positioned within at least one opening formed within a portion of the elongate stub wall, closest to the said handle securing position, which elongate stub wall defines a plane, and said opening has two facing wall portions which are aligned substantially orthogonally to the said elongate stub wall plane; and handle retaining means near to said stub wall opening, the retaining means comprising at least one resilient connection between a portion of the handle at least near to the butt end and at least one surface near to said stub wall opening for resiliently retaining the handle in at least one further position, in addition to said first operative position, with a retention force which can be overcome by manual movement of said handle; and at least one of the at least three wheels occupy a first operative position orthogonal to the device base and rotate 360 degrees about at least one vertical axis defined by a support axle supporting the at least one wheel; and the periphery of said at least three wheels in the operative position are substantially below the device base, and in a second, stowed position each of the said wheels and their associated support axles are near to parallel with the device base, located within the device outer perimeter.

15. A device in accordance with claim 14, including an opening within the plane and side elevational profile of said stub walls in near proximity to the handle securing position; an access covering, removably mounted to a portion of the carrier device, in near proximity to the handle securing position; said access covering is movable between a first, operative position substantially occupying said opening, within the side elevational profile of the device stub walls; said covering is of a shape to substantially emulate the side elevational profile of the adjacent stub walls when occupying said operative position; a second, stowed position of said covering which permits movement of said handle to a stowed handle position at least partly through said stub wall opening and substantially within the side elevational profile of the device.

16. A wheeled carrier device comprising:
a base member including a multiplicity of formed, upwardly projecting stub walls, defining a side elevational profile and an outer perimeter;
each stub wall defining a plane, and including a free upper edge;
at least two wheels which provide rolling support to the base member of the carrier device; and
at least two separate wheel assembly receiving cavities formed in the device stub wall thickness, each cavity being defined by open space in the stub wall which substantially comprises the thickness and plane of the stub wall;
at least two wheel assemblies with a first, operative position, each wheel assembly mounted to the base member within the wheel assembly receiving cavity, incorporating oppositely extending mounting means recessed within portions of the carrier device side elevational profile and stub wall thickness adjacent the wheel assembly receiving cavity, and also incorporating wheel attaching means interconnected to at least one wheel;
the at least one wheel associated with the wheel assembly includes an outer rim and a central hub, the hub including a transverse opening therein, and the wheel attaching means for the at least one wheel including at least one elongate wheel support element, the wheel support element including a first transverse portion received in the opening in the hub and forming an axle about which the at least on wheel rotates, and at least one second uppermost portion extending orthogonally to the first transverse portion and being affixed to the wheel assembly entering into the bottom portion of the wheel assembly recessed substantially within the plane defining the stub wall incorporating the wheel assembly, and terminating in a second end by terminal fixing means disposed proximate to the second end, substantially recessed within the thickness and plane of the stub wall, which terminal fixing means secure said at least one wheel, and said elongate support element to the wheel assembly, at least one releasable latching means incorporated into, and substantially recessed within the wheel assembly, which positively latches each wheel assembly against movement when in at least the first position by movement of a portion of the latch between the wheel assembly and a portion of the carrier device base member adjacent to the wheel assembly;

in the first, operative position the at least one wheel of each wheel assembly provides rolling support, and in a second, stowed position of the wheel assembly the outer stub wall profile is interrupted revealing a cavity, and the wheel attaching means and the interconnected at least one wheel are located within the device outer perimeter.

17. A wheeled carrier device comprising:

a base member including a multiplicity of formed, upwardly projecting stub walls with a free upper edge, defining a side elevational profile and an outer perimeter;

at least two wheels which provide rolling support to the base member of the carrier device;

at least two separate wheel assembly receiving cavities formed out of the device stub wall thickness, each cavity being defined by open space in the stub wall; and at least two wheel assemblies, each wheel assembly including a plurality of support surfaces perpendicular to a lower base portion, defining a wheel assembly housing periphery with interconnected components substantially recessed within said housing periphery; and each wheel assembly's interconnected components further include both wheel assembly mounting means and wheel attaching means interconnected to at least one wheel;

housed at least partly within the wheel assembly housing periphery are transversely disposed, oppositely extending mounting elements, which occupy adjacent portions of the carrier device base member, about which the wheel assembly pivots, the wheel attaching means enter the lower base portion of the wheel assembly housing periphery and interconnect to at least part of the oppositely extending mounting elements thereby at least partly providing structural support to the at least one wheel;

in the first operative position of the wheel assemblies each associated wheel is orthogonal to the device base providing rolling support, and the periphery of each wheel assembly housing substantially occupies the wheel assembly receiving cavity;

in a second, stowed position of each wheel assembly, the outer stub wall profile is interrupted revealing a cavity, and the wheel attaching means and the interconnected at least one wheel of each wheel assembly are at least near to parallel with the device base, located within the device outer perimeter; and latching means which positively latch each wheel assembly against movement when in the first position, which latching means engages a portion of the carrier device base member and a portion of the wheel assembly.

* * * * *